(12) United States Patent
Venkataramani et al.

(10) Patent No.: US 9,641,973 B2
(45) Date of Patent: May 2, 2017

(54) METHOD AND APPARATUS FOR TRACKING, IN REAL-TIME, A POSITION OF A MOBILE WIRELESS COMMUNICATION DEVICE

(71) Applicant: Marvell World Trade Ltd., St. Michael (BB)

(72) Inventors: Thandapani Venkataramani, Fremont, CA (US); Xing Zhao, Santa Clara, CA (US); Xin Zhang, Shanghai (CN); Zhike Jia, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 220 days.

(21) Appl. No.: 14/565,377

(22) Filed: Dec. 9, 2014

(65) Prior Publication Data

US 2016/0353241 A1 Dec. 1, 2016

Related U.S. Application Data

(60) Provisional application No. 61/915,417, filed on Dec. 12, 2013.

(51) Int. Cl.
*H04M 1/00* (2006.01)
*H04W 4/02* (2009.01)
(Continued)

(52) U.S. Cl.
CPC .......... *H04W 4/023* (2013.01); *H04L 49/109* (2013.01); *H04W 40/005* (2013.01); *H04W 52/0206* (2013.01)

(58) Field of Classification Search
CPC .................................................. H04W 64/00
(Continued)

(56) References Cited

U.S. PATENT DOCUMENTS

| 7,313,402 | B1 | 12/2007 | Rahman |
| 7,685,606 | B2 * | 3/2010 | Chang ................ G06F 1/3203 |
| | | | 342/357.52 |

(Continued)

OTHER PUBLICATIONS

Marvell 88L1000 GPS Hybrid Location Processor product brief, Marvell Semiconductor, Inc., 2012.
(Continued)

*Primary Examiner* — Kiet Doan

(57) ABSTRACT

The present disclosure describes systems and techniques relating to determining a real-time position of a mobile device. According to an aspect of the described systems and techniques, a data processing apparatus includes: one or more integrated circuit (IC) devices including a location processor configured to acquire and track measurements of location for a mobile wireless communication device; and a host processor programmed with a host software manager configured to obtain various positioning input signals from different device positioning technologies and assemble a selected set of the various positioning input signals into a unified format; wherein the data processing apparatus includes a hybrid fusion engine configured to receive data from the host software manager in the unified format and calculate a position of the mobile wireless communication device using the received data in accordance with input type information for the received data.

17 Claims, 4 Drawing Sheets

(51) Int. Cl.
  *H04L 12/933* (2013.01)
  *H04W 52/02* (2009.01)
  *H04W 40/00* (2009.01)

(58) Field of Classification Search
  USPC ............ 455/456.1, 456.3, 456.6, 457, 414.1,
  455/456.2; 340/573.1, 539.13;
  342/537.32; 345/633
  See application file for complete search history.

(56) References Cited

U.S. PATENT DOCUMENTS

| | | | |
|---|---|---|---|
| 9,026,135 B2 | 5/2015 | Takahashi | |
| 2005/0130677 A1 | 6/2005 | Meunier | |
| 2005/0253755 A1 | 11/2005 | Gobara | |
| 2006/0030334 A1 | 2/2006 | Hashimoto | |
| 2006/0119476 A1 | 6/2006 | Hope | |
| 2007/0049295 A1 | 3/2007 | Soliman | |
| 2007/0243829 A1 | 10/2007 | Nagato | |
| 2008/0026770 A1* | 1/2008 | Rudravaram | G01S 5/0289 455/456.1 |
| 2009/0005975 A1 | 1/2009 | Forstall et al. | |
| 2009/0196267 A1 | 8/2009 | Walker | |
| 2009/0291641 A1 | 11/2009 | Sato | |
| 2011/0018732 A1 | 1/2011 | Cho | |
| 2011/0189960 A1 | 8/2011 | Bhattacharya | |
| 2011/0316880 A1 | 12/2011 | Ojala | |
| 2012/0188057 A1 | 7/2012 | Green et al. | |
| 2012/0221244 A1 | 8/2012 | Georgy | |
| 2013/0237245 A1 | 9/2013 | Tinnakornsrisuphap | |
| 2014/0004876 A1 | 1/2014 | Fuller | |
| 2014/0114568 A1* | 4/2014 | Park | G01S 5/0263 701/469 |
| 2014/0149069 A1 | 5/2014 | Kelly | |
| 2014/0278084 A1 | 9/2014 | Lau | |
| 2014/0335887 A1 | 11/2014 | Liu | |
| 2015/0264534 A1 | 9/2015 | Liu | |
| 2015/0282111 A1* | 10/2015 | Yang | H04W 4/04 455/456.1 |

OTHER PUBLICATIONS

Jim Costabile, Wireless Position Location Tutorial, Virginia Tech Wireless Symposium, Jun. 4, 2010.
Authorized Officer Sylvia Lampreia, Invitation to Pay Additional Fees, International Application No. PCT/US2014/034568, mailed Nov. 21, 2014, 6 pages.

* cited by examiner

METHOD AND APPARATUS FOR TRACKING, IN REAL-TIME, A POSITION OF A MOBILE WIRELESS COMMUNICATION DEVICE

CROSS REFERENCE TO RELATED APPLICATIONS

This application claims the benefit of the priority of U.S. Provisional Application Ser. No. 61/915,417, filed Dec. 12, 2013 and entitled "SYSTEMS AND DEVICES FOR INTEGRATING HYBRID LOCATION SOLUTION", which is incorporated herein by reference.

BACKGROUND

The present disclosure describes systems and techniques relating to determining a real-time position of a mobile device.

A mobile device such as a smart phone or tablet computer is often built from multiple devices, which can include a radio chip coupled with an antenna, a general purposes processor, and inertial and/or MEMS (Micro-Electromechanical Systems) sensors. In addition, a mobile device can run one or more location-aware applications that are programmed to perform location-based tasks such as store finding and transit routing. Location-aware applications can determine a position of a mobile device using various technologies, such as satellite-based positioning systems (e.g., the Global Positioning System (GPS)) and ground-based cell phone systems or wireless network systems (e.g., WiFi).

SUMMARY

The present disclosure describes systems and techniques relating to determining a real-time position of a mobile device. According to an aspect of the described systems and techniques, a data processing apparatus includes: one or more integrated circuit (IC) devices including a location processor configured to acquire and track measurements of location for a mobile wireless communication device; and a host processor programmed with a host software manager configured to obtain various positioning input signals from different device positioning technologies and assemble a selected set of the various positioning input signals into a unified format; wherein the data processing apparatus includes a hybrid fusion engine configured to receive data from the host software manager in the unified format and calculate a position of the mobile wireless communication device using the received data in accordance with input type information for the received data.

The different device positioning technologies can include: a satellite navigation receiver, a first range wireless transceiver; a second range wireless transceiver, and one or more sensors. The one or more sensors can include: a motion sensor; an environment sensor; and an optical sensor. In addition, the host processor can be an application processor programmed to run the hybrid fusion engine.

The data processing apparatus can include a measurement aggregator between the different device positioning technologies and the host software manager. The host software manager can be further configured to manage a location database for wireless positioning and map aiding information used with the position calculation. The location database can include a virtual database distributed between a first database local to the mobile wireless communication device and one or more second databases accessible over a network, and the host software manager can maintain data relevant to the calculated position in the first database. Further, the host software manager can control selection and indexing of map data based on global coordinates from a satellite navigation receiver, including caching map data in the first database.

The host software manager can be further configured to trigger the different device positioning technologies based on location context information. The location context information can come from multi-context detection based on user activity, dynamics and environment, and the host software manager can be configured to trigger the different device positioning technologies to reduce power consumption while meeting a desired quality of positioning. In addition, the host software manager can include: a middleware interface configured to communicate with a selected host middleware; an assistance interface configured to trigger AGNSS (Assisted Global Navigation Satellite System), predicted ephemeris, sensors, and wireless assistance procedures; a data interface through which the location database is managed; a power management module configured to provide context aware device management; and core logic configured to operate the middleware interface, the assistance interface, the data interface, and the power management module.

According to another aspect of the described systems and techniques, a method includes: obtaining various positioning input signals from different device positioning technologies and an IC-based location processor configured to acquire and track measurements of location for a mobile wireless communication device; assembling a selected set of the various positioning input signals into a unified format; sending assembled data in the unified format to a fusion engine configured to calculate a position of the mobile wireless communication device using the assembled data in accordance with input type information for the assembled data; receiving calculated position information from the fusion engine; and outputting the calculated position information for use by the mobile wireless communication device.

The obtaining can include: receiving a position input signal from a satellite navigation receiver, receiving a position input signal from a first range wireless transceiver; receiving a position input signal from a second range wireless transceiver; and receiving a position input signal from one or more sensors, including a motion sensor. The method can include providing location measurement aiding feedback to the IC-based location processor based on the calculated position information. Further, the method can include managing a location database for wireless positioning and map aiding information used with the position calculation.

The location database can include a virtual database distributed between a first database local to the mobile wireless communication device and one or more second databases accessible over a network, and the method can include maintaining data relevant to the calculated position in the first database. The method can include caching map data in the first database based on global coordinates from a satellite navigation receiver of the mobile wireless communication device.

The method can include triggering the different device positioning technologies based on location context information. The triggering can include sending wakeup and sleep signals to different ones of the different device positioning technologies based on the location context information. In addition, the location context information can come from multi-context detection based on user activity, dynamics and environment, and the triggering can include triggering the different device positioning technologies to reduce power consumption while meeting a desired quality of positioning.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable hardware processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The described systems and techniques can result in one or more of the following advantages. A framework can facilitate integration of multiple device positioning technologies, including GNSS (Global Navigation Satellite System) receiver technologies and MEMS sensors, and hybrid location tracking using wireless positioning and map matching. Various positioning technologies that are available in a mobile platform can be used with each other in a complementary fashion, including using information from one positioning technology to improve the calculations of another positioning technology. This can facilitate the extension of GNSS solutions in challenging areas, such as indoors and in urban canyons. In addition, the framework can expose various application program interfaces (APIs) for position engines to retrieve different sensor data, wireless measurement and location database information.

Details of one or more implementations are set forth in the accompanying drawings and the description below. Other features and advantages may be apparent from the description and drawings, and from the claims.

DRAWING DESCRIPTIONS

DETAILED DESCRIPTION

Figure 1A:
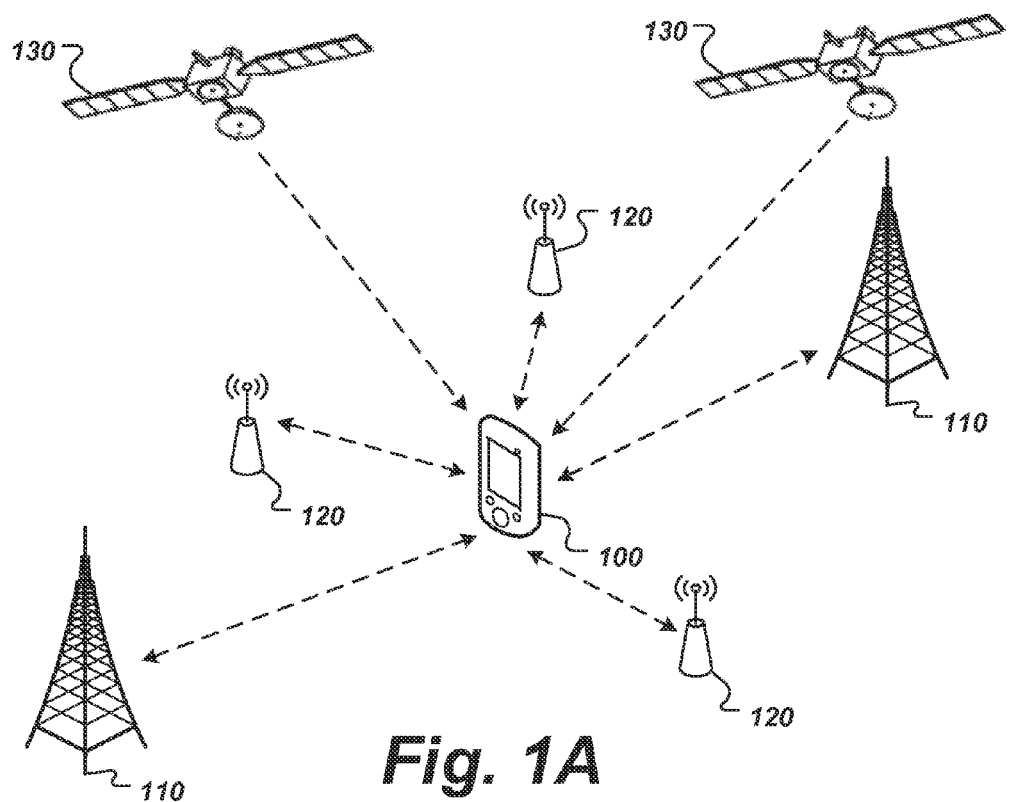
FIG. 1A shows an example of a mobile wireless communication system.

FIG. 1A shows an example of a mobile wireless communication system including a mobile wireless communication device 100 (referred to herein also as "mobile device 100"). In the example of FIG. 1A, the mobile wireless communication device 100 is configured to communicate using multiple different types of wireless communication technologies. In particular, the mobile device 100 is configured to receive positioning signals from a satellite-based positioning system 130 (e.g., GPS). The mobile device 100 is also configured to communicate with short range wireless access points 120 and separately with long range wireless base stations 110. The short range wireless access points 120 can be WiFi access points to one or more local area networks. In addition, the long range wireless base stations 110 can be cell phone base stations for one or more cell phone networks.

As will be appreciated, the different wireless communication technologies 110, 120, 130 include different device positioning technologies. The mobile device 100 can be designed to obtain various positioning input signals from the different device positioning technologies and assemble and process this information to determine a physical position in space (e.g., position tracking in real-time) of the mobile device 100. In addition, a current context (such as indoor/outdoor, moving fast/moving slow, stationary, etc.) for the mobile device 100 can be used to determine which device positioning technologies to use and in what manner. For example, if a motion sensor indicates the mobile device 100 is currently stationary, there is no need to do device positioning using stations 110, access points 120, or system 130; thus, corresponding positioning technologies that are not needed can be put to sleep (to save power) until the mobile device begins moving. As another example, the current position and velocity of the mobile device can inform which positioning technology to use (e.g., when travelling over four miles per hour, WiFi positioning can be turned off in favor of satellite-based positioning) and whether to retrieve map information for assistance.

Figure 1B:
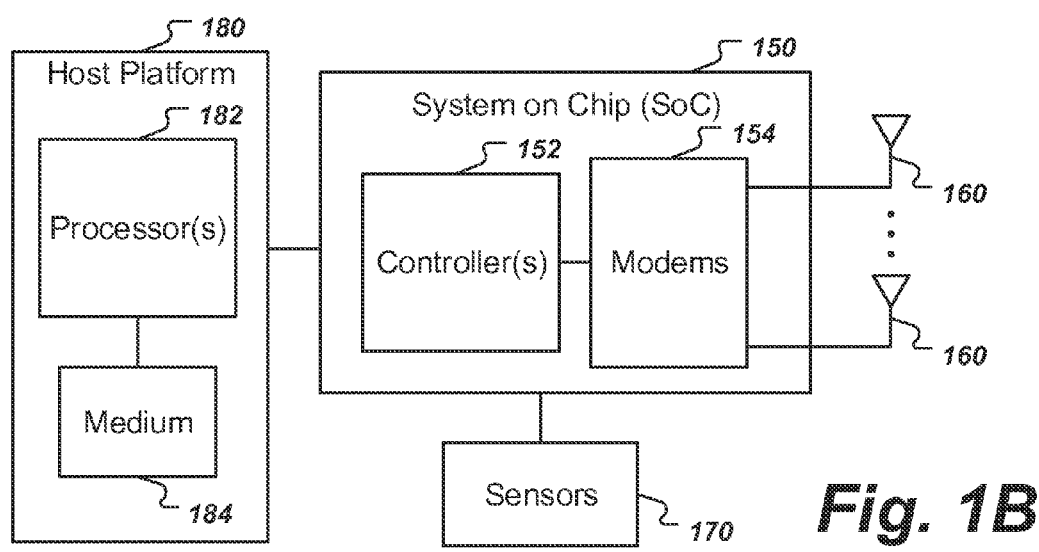
FIG. 1B shows an example of a mobile wireless communication device.

Implementations in accordance with FIG. 1A can include various architectures using hardware, firmware and software. FIG. 1B shows an example of a mobile wireless communication device. In this example, the mobile wireless communication device includes a System on Chip (SoC) 150, one or more antennas 160, sensors 170, and a host platform 180. The SoC 150 represents one or more integrated circuit (IC) devices including a location processor configured to acquire and track measurements of location for the mobile wireless communication device. Other configurations are possible, and the one or more IC devices (e.g., the SoC 150) can be integrated into the host platform 180.

The SoC 150 can include one or more controllers 152 and modems 154. The modems 154 can handle the different wireless technologies employed by the mobile wireless communication device. For example, the SoC 150 can be combination radio chip that handles near field communications (NFC), Bluetooth (BT), WiFi, and one or more mobile phone technologies, such as WCDMA (Wideband Code Division Multiple Access), CDMA2000, UMTS (Universal Mobile Telecommunications System), GSM (Global System for Mobile communications), High Speed Packet Access (HSPA), and LTE (Long-Term Evolution, often referred to as 4G). The antennas 160 can include an antenna that is shared by different wireless technologies, one or more antennas that are dedicated to a particular wireless technology, and/or two or more antennas used for a particular wireless technology. For example, in some implementations, a set of antennas 160 can be used for multiple input multiple output (MIMO) communications. The one or more controllers 152 can process data from and provide control signals to the modems 154, the sensors 170, and/or the host platform 180.

The sensors 170 can include motion sensor(s) (e.g., inertial MEMS sensors), environment sensor(s), and optical sensor(s). One or more of these sensors 170 can be integrated with the SoC 150 or the host platform 180. The host platform 180 includes one or more hardware processors 182 and at least one medium 184. The medium 184 is a computer-readable medium (such as described further below) that can include firmware or software that operates on the processor(s) 182, the controller(s) 152, or both. In some implementations, a host processor 182 is programmed with a host software manager configured to obtain various positioning input signals from different device positioning technologies and assemble a selected set of the various positioning input signals into a unified format, and either the host processor 182 is programmed to run (or the SoC 150 includes) a hybrid fusion engine (or processor) configured to receive data from the host software manager in the unified format and calculate a position of the mobile wireless communication device using the received data in accordance with input type information for the received data. For example, a unified binary format can be used to encode in a Type-Length-Value (TLV) format, where the type includes the measurement from various positioning sources and positioning aiding information (e.g. position, velocity, orientation, motion mode etc.)

Figure 2:
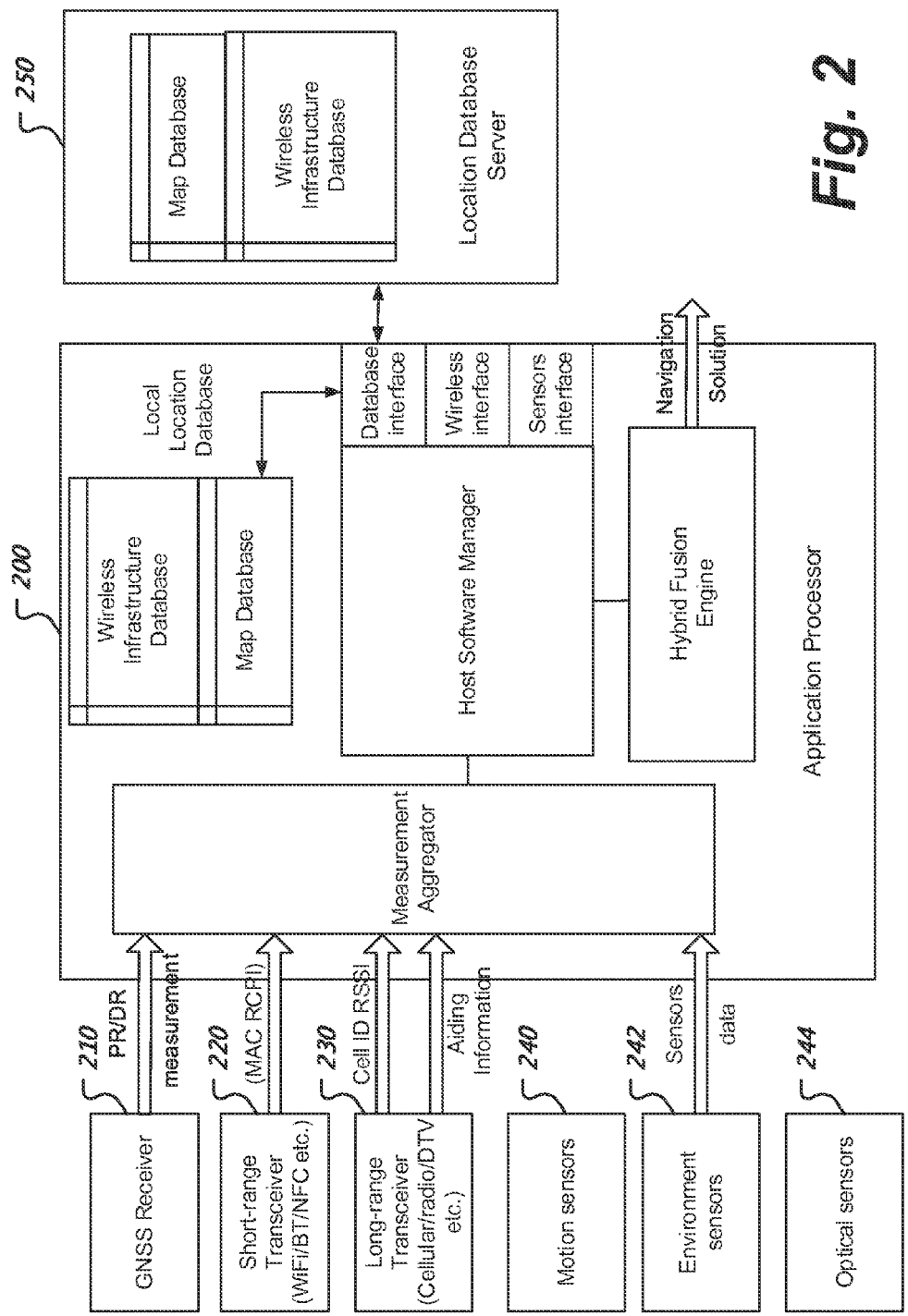
FIG. 2 shows an example of a system architecture for a mobile wireless communication device.

FIG. 2 shows an example of a system architecture for a mobile wireless communication device. In this example, an application processor 200 corresponds to a host processor 182 from FIG. 1B. The mobile wireless communication device includes a GNSS (Global Navigation Satellite System) receiver 210 (e.g., a GPS receiver), a short-range transceiver 220 (e.g., WiFi, BT, NFC, etc.), and a long-range transceiver 230 (e.g., cellular, radio, digital television (DTV), etc.). The mobile wireless communication device also includes one or more motion sensors 240 (e.g., accelerometer(s), gyroscope(s), and magnetometer(s)), one or more environment sensors 242 (e.g., barometer, humidity, and temperature sensors), and one or more optical sensors 244 (e.g., an ambient light or proximity sensor for use in detecting indoor/outdoor transitions). As will be appreciated, in some implementations, not all of these inputs are provided.

The application processor 200 can run a measurement aggregator that receives positioning inputs from different wireless positioning technologies. For example, the measurement aggregator can receive satellite Pseudo Range (PR) and Doppler Range (DR) measurement information from the GNSS receiver 210. The measurement aggregator can receive Media Access Control (MAC) address and Received Channel Power Indicator (RCPI) information from the short-range transceiver 220. The measurement aggregator can receive cell identifier (ID) and received signal strength indicator (RSSI) information and also aiding information from the long-range transceiver 230. Finally, the measurement aggregator can receive sensor data from the sensors 240, 242, 244.

The measurement aggregator can be designed to collect data from the various input signals into a generic model that will work even if some of the information is not available; thus, the measurement aggregator can be designed to work with whatever data is provided to it at a given point in time. The generic model can be based on a data definition, as described above, and as long as at least a portion of the positioning measurements are available, the data can be selected and transferred to HSM for processing.

The measurement aggregator can include a separate engine for each potential input from the different technologies, but some of these engines can be linked together in some fashion, or operate cooperatively. In some implementations, each engine within the measurement aggregator can autonomously do device positioning (including an engine for a motion sensor, which can track movements once provided an initial position). The measurement aggregator can fuse the positioning calculations from the different engines inside the measurement aggregator and output a common position to a host software manager (HSM). In some implementations, the HSM has access to the outputs of the individual engines within the measurement aggregator and can exert control thereof.

In addition, aiding information can be processed within the measurement aggregator and also provided from one engine to another. For example, motion sensor information can be used to identify drift and assist in fine tuning of positioning done with other technologies. In some implementations, positioning information from other technologies can be used to tune the signals received from the GNSS receiver 210 and thus provide better tracking performance.

The application processor 200 can also run the HSM, which can include a database interface, a wireless interface, and a sensors interface. The HSM can use the database interface to update local database(s). The HSM can use the wireless interface to handle management functions for a cellular network, e.g., to handle protocol messages for the cellular network. The HSM can use the sensors interface to obtain extra information from available sensors (e.g., local magnetic field information for a magnetic field sensor) to assist in determining location.

The HSM can be programmed to autonomously monitor and collect various input signals from the measurement aggregator and also transfer the data into a hybrid fusion engine, where the multi-sensors data can be fused to generate a navigation solution for the mobile wireless communication device. In addition, the HSM can manage a location database for wireless positioning and map aiding. This location database can include a wireless infrastructure database and map database, and the location database can be split between a local location database and location database server 250, which is accessible over one or more of the different wireless communication technologies employed by the mobile wireless communication device. In some implementations, the HSM communicates with a remote database server 250, as needed, to retrieve information for local caching based on current wireless positioning context.

For example, if the mobile wireless communication device determines that the mobile wireless communication device is getting close to a building, map information for that building (e.g., floor plans and WiFi access points therein) can be retrieved. The location database can be presented to other software as a local database, as if all the data is available locally, even though the HSM actually uses a remote location database server 250, as needed. In general, data that will likely be needed can be cached in the local database in advance, and when a request for data not in the cache database is received, the data can be retrieved from one or more database servers. In some implementations, the HSM has information for multiple different database servers from which data can be retrieved, thus providing backup options for obtaining data if one particular server is unavailable at the time of the request.

In some implementations, this can be viewed as integrating all the assistance concepts, not just AGNSS (Assisted Global Navigation Satellite System) assistance, but also creating map as an assistance, wireless information as an assistance, or the geographic area of the sensor-based tracking model as an assistance. Thus, measurements and assistance can be generated and put together to get a fix that is a better quality fix on position. In addition, certain positioning engines can either be triggered or not triggered based on context and whether a good quality of positing is already obtained with some subset of the available technologies (e.g., good position based on certain sensors, which may have lower power consumption).

Predicting which positioning technologies should be used based on current context, and then using those positioning technologies appropriately, can have significant benefits, including in power savings. In general, any positioning technology that doesn't require a radio (e.g., the sensors) is often low power as compared with other positioning technologies that do require a radio (e.g., WiFi). In some cases, with a good initial position, the device location can be accurately tracked over significant distances using only the motion sensors, which can reduce power consumption for position tracking.

In addition, the positioning technologies that are not used, need not be fully turned off. The positioning technologies that are not used can be put into a sleep mode or turned off temporarily or periodically. For example, a GPS receiver 210 can be kept mostly off, but also turned on periodically to recalibrate position tracking being done using other technologies. This can result in large power savings without risking substantial drift in position tracking. Note also that the frequency of turning off the GPS can depend on the speed of movement of the device.

Figure 3:
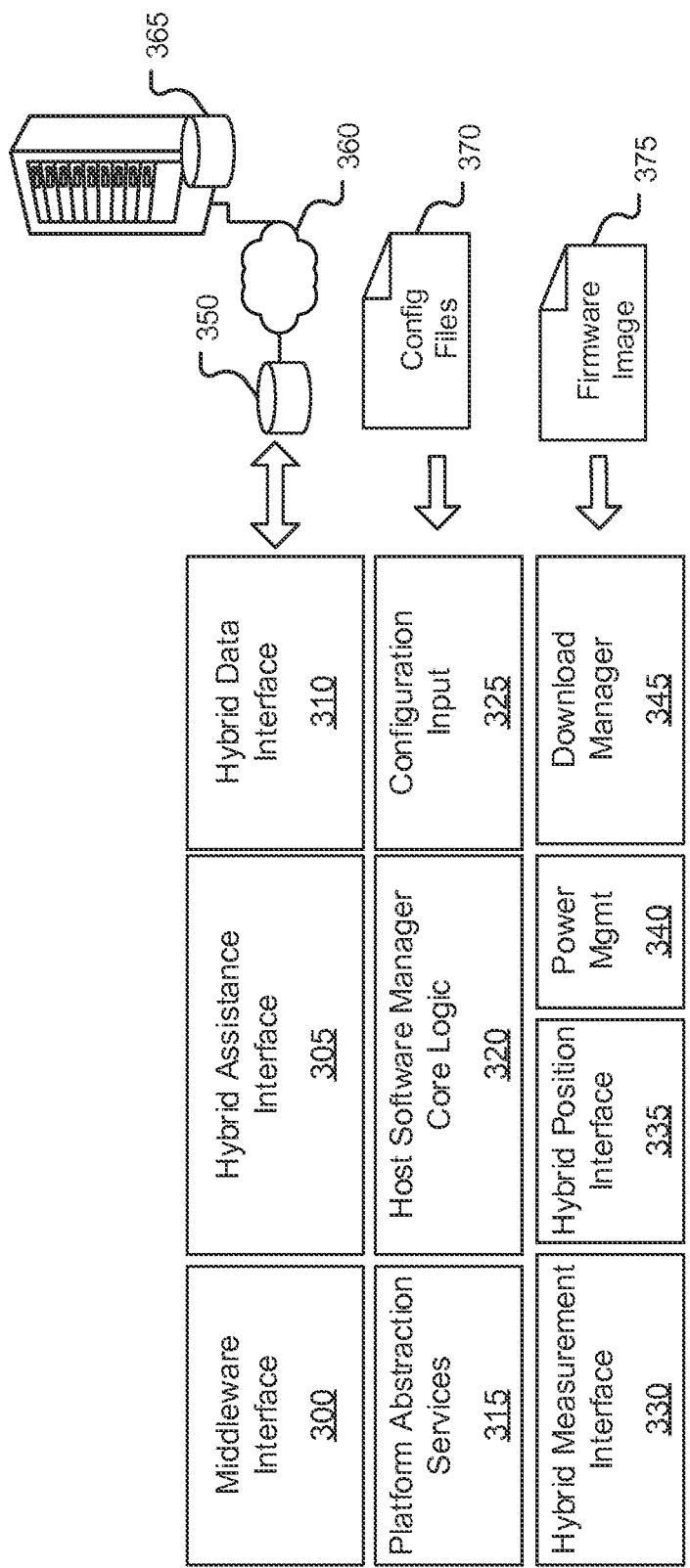
FIG. 3 shows modules inside an example of a Host Software Manager (HSM).

FIG. 3 shows modules inside an example of a Host Software Manager (HSM). The HSM can interface with various parts of the platform to get all information required from different sources. In some implementations, the HSM is programmed to control the interfaces for all the positioning inputs from different sources. Individual positioning technologies can be used, with cross-over feedback between them. In addition, a generalized database model can be used to allow retrieval of information from the multiple different sources, and all this information can be put together in the HSM. In some implementations, pulling together the information from various sources to give an integrated update to position can be done by a hybrid fusion engine. A hybrid fusion engine can be software that also runs on the host platform, or a hybrid fusion engine can be integrated with control circuitry (e.g., in SoC 150).

The HSM includes a middleware interface 300, a hybrid assistance interface 305, and a hybrid data interface 310. The hybrid data interface 310 connects with both a local database 350 and a remote database 365 accessible over a network 360. The HSM can be programmed to maintain and update the local database 350, as needed. The hybrid data interface 310 can be programmed to enable the concept of the local database 350, but on the backlink with a much wider database 365 in the cloud; for the software, it will be a simple database query. Thus, the location database can be a virtual database distributed between a first database 350 local to the mobile wireless communication device and one or more second databases 365 accessible over a network, and the HSM can maintain data relevant to the calculated position in the first database 350. In addition, the HSM can control map selection and indexing of map data based on global coordinates from a satellite navigation receiver, including caching map data in the first database 350, as needed.

The hybrid assistance interface 305 can provide a module through which to obtain information from triggering AGNSS, predicted ephemeris, sensors, and wireless assistance procedures. The middleware interface 300 provides an abstraction module to facilitate access to different middleware software found on different platforms (e.g., Android location services integration). The HSM can also include a platform abstraction services module 315, host software manager core logic 320, and a configuration input module 325 to receive configuration file(s) 370. The platform abstraction services module 315 can provide access to Hardware Abstraction Layer (HAL) and OEM (Original Equipment Manufacturers) Adaptation Layer (OAL) drivers. In addition, the HSM can include a hybrid measurement interface module 330, a hybrid position interface module 335, a power management module 340, and a download manager 345, e.g., to receive firmware logic 375.

The HSM can handle GNSS receiver setting, such as configuration, firmware image download, power management, and all platform related services interface. In some implementations, code to be run on both the host application processor and the wireless chip can be downloaded (e.g., hybrid location processor code), and the download manager 345 can be included to facilitate downloading code to the IC chip. The power management module 340 can be used to integrate various information relating to a current context of the mobile wireless communication device, such as whether the mobile wireless communication device is indoors or outdoors, whether the mobile wireless communication device is moving fast or moving slow, whether the mobile wireless communication device is stationary, etc. This integrated context information can be used to trigger and use (or not use) information from various sources, such as by triggering messages to different positioning engines, and provide context aware power management.

The hybrid position interface module 335 can interface with each of the positioning engines, such as by triggering positioning and processing reports therefrom. In some implementations, the hybrid position interface module 335 is responsible for getting all appropriate information from all available positioning technologies and giving the obtained information out to other parts of the HSM. The hybrid measurement interface 330 can be a generic interface to read measurements from various sources. For example, for GSM, the information can be read from the chip. However, there are other sources, such as sensors, that may be platform dependent with respect to how positioning data is obtained. For example, in some implementations, the host platform may not provide direct access to the sensor drivers, so the parts that vary from platform to platform can be abstracted away by the hybrid measurement interface 330 so the same core engine can be used in different platforms. Thus, the hybrid measurement interface 330 can read measurements from a data aggregator, such as described above, and measurements can be read using different paths for different platforms by the hybrid measurement interface 330 (e.g., read either from the platform operating system, such as Android, or directly from a sensor). Similar techniques apply for other positioning technologies, such as a WiFi scan for which either an internal interface (through the IC chip) will be available or an operating system interface will be available, depending on the mobile device platform.

In any case, the hybrid measurement interface 330 can read measurements from multiple sensors and wireless messages on the platform for positioning, then the hybrid measurement interface 330 can assemble the data into a unified packet format and trigger a proper hybrid positioning engine according to the input type, such as by launching GNSS, sensors-based, wireless positioning and map matching engines. When external assistance data are needed, the hybrid assistance interface 305 module can be used to trigger external data from AGNSS, predicted ephemeris, etc. When wireless positioning or map matching requires search location information from the database 350, HSM manages the data interface through the hybrid data interface 310, where frequently used location data can be retrieved from the cloud server 365 and maintained locally 350 on the platform.

Figure 4:
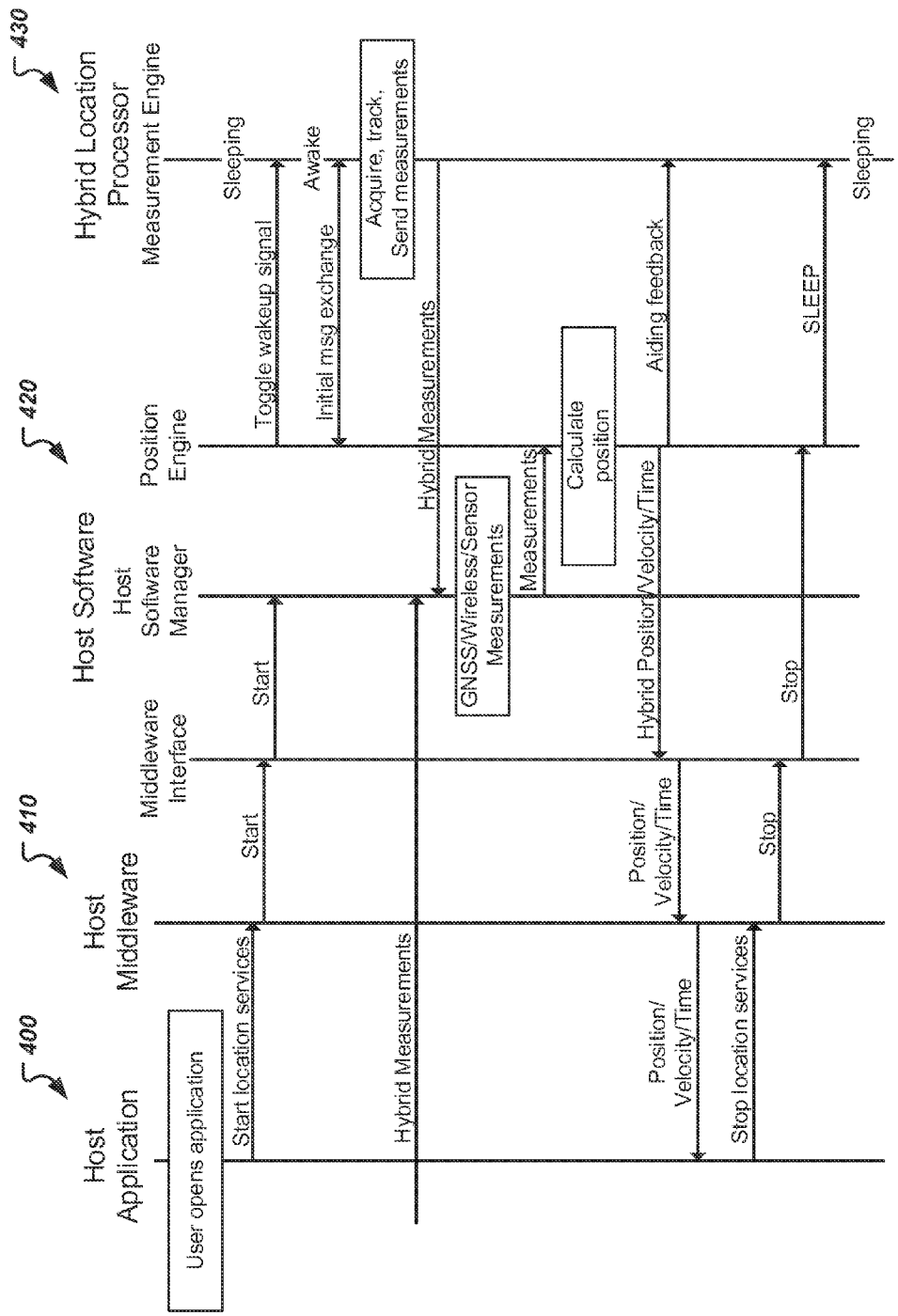
FIG. 4 shows an example of an operational sequence in accordance with some implementations.

FIG. 4 shows an example of an operational sequence in accordance with some implementations. This operational sequence shows an example of communications between a host positioning application 400 (e.g., a map application), host middleware 410 (e.g., the Android operating system), host software 420 (e.g., including a middleware interface, a host software manager, and a position/fusion engine), and a positioning processor 430 (e.g., a hybrid location processor with measurement engine). A host application 400 can start location services via a message to the host middleware 410 when a user opens the application. The host middleware 410 sends a Start message to the HSM through the middleware interface. Note that the middleware interface can be a porting layer of the HSM, which can be implemented for each target host platform.

The HSM wakes up one or more positioning measurement sources (e.g., send a toggle wakeup signal to the sleeping location processor 430, and receive an initial message exchange after the processor 430 awakes), and the HSM calculates a navigation solution consisting of position, velocity and time. The HSM can receive hybrid measurements from the host (application and/or middleware) and from the processor 430. In addition, the HSM can get measurements from inside services in addition to outside services. For example, in some implementations, GNSS/Wireless/Sensor Measurements can be received internally (when implementing a sensor hub). In some implementations, WiFi scan or sensor information can be received from an outside service (e.g., when receiving position aiding information from a cloud-based server).

All appropriate measurements can be pulled together in the HSM, and then the positioning engine can be triggered using these measurements as inputs to calculate the position (e.g., Hybrid Position/Velocity/Time) which is sent back to the middleware interface, which then communicates the information to the upper layer for use by the application (e.g., putting the dot on the map saying this the location). When the location services are stopped, this information passes through the architecture, and the HSM can cause corresponding hardware (e.g., the location processor 430, which can acquire, track, and send measurements regarding location) to enter a sleep state.

In these implementations, note that the HSM is not running on the wireless chip but on the host. Retaining the HSM on the host enables interactions with all the various sources, including those that may need to be protected, such as the interface from the wireless chip (e.g., the wireless cellular interface or the WiFi network). The position/fusion engine is described here as running on the host, but in some implementations, the position/fusion engine can be put on the chip. The architecture readily supports such variations, which can be made based on the processing power and capabilities of the tracker engine on the wireless chip. In some implementations, the position/fusion engine and the hybrid location processor 430 are merged together on the wireless chip. Thus, the architecture fosters compatibility across different hardware and software platforms, including those with very low power wireless chipsets.

In some embodiments, radio frequency scan for wireless positioning is enabled within the architecture. Based on the contextual information, such as when a user is indoor without GNSS signals, the HSM can interface with wireless chipsets to trigger a wireless scan to get received signal power and parse time stamped beacon messages. Note that the determination made by one technology (e.g., an indoor/outdoor determination by an optical sensor, or a moving/stationary determination by a motion sensor) can be used to know when to use one or more other technologies. For example, if it determined that the user of the mobile wireless communication device is driving, then triggering of WiFi positioning can be disabled.

As another example, GSM positioning need not be triggered if the current location is such that a good quality GSM position is unlikely obtainable. Moreover, map data can also be used to trigger different technologies, such as when nearby buildings are known to have short range nodes (e.g., a BT node) that can be used by the mobile wireless communication device, then the corresponding technology can be enabled on the mobile wireless communication device with map matching information. Note that the mobile device need not store a lot of information locally since this information is accessible on the network and can be dynamically obtained by the mobile wireless communication device with appropriate programming (e.g., in the HSM).

In some implementations, intelligent management of the location database is performed for positioning. The HSM can maintain a virtual database (as discussed above) distributed between the host and one or more remote servers. The remote server(s) can keep a complete database, while data relevant to the user's location can be maintained on the host. Using this virtual database approach, various software components in the host can be kept unaware that data is being pulled over a network rather than from a local database. This unified model of the location database can help with implementation and compatibility across platforms.

In some implementations, map data is enabled for aiding hybrid positioning. Maps data can improve positioning accuracy and provide enriched navigation features and services. The HSM can control the whole process of map interface, such as selecting and indexing the map database based on the global coordinates from the GNSS receiver, caching the most frequently used map data and calling a map matching function in the hybrid engine. For example, if it is known that a building being entered has many WiFi access points, the HSM can download only the portion of the WiFi access points that are immediately relevant, such as those on the floor of the building the user is on. Thus, the map data can be split according to geographical areas or according to buildings, including even at the level of floor plan data. Signals from other floors can be ignored until an indication that the user is on a new floor (e.g., from a pressure sensor) is received.

In some implementations, power consumption can be optimized while meeting required quality of positioning, based on multi-context detection (user activity, dynamics and environment) and intelligent selection of appropriate technologies. Thus, the location context information can come from multi-context detection based on user activity, dynamics and environment, and the HSM can be configured to trigger the different device positioning technologies to reduce power consumption while meeting a desired quality of positioning.

Moreover, the method and architecture described can allow flexible combinations of multiple positioning technologies, including GNSS receiver, motion sensors, environmental sensors, optical sensors, wireless transceivers, map data, assisted-GNSS data, predicted ephemeris data, etc. The unified measurement processing architecture and interfacing mechanism can facilitate collaborative aiding between different technologies, context aware based power management, and system resource scheduling for multiple positioning engines. By providing a large amount of information for positioning through a simpler architecture, the positioning information can be dealt with in a more generic way in the software, simplifying the overall implementation while maintaining the flexibility and power of positioning based on a dynamic combination of positioning technologies.

Using the current context, the number of measurements used, and thus the number of different positioning technologies employed, can be reduced. This can result in significant power savings without any substantial loss in positioning accuracy. In addition, this process can be ramped up or down based on the battery level of the device, thus sometimes sacrificing some positioning accuracy in favor of longer battery life. In some implementations, the one or more least power intensive technologies are used on a regular basis, and these can be recalibrated periodically using more power intensive and accurate technologies, where the frequency of recalibration and/or the number of technologies used can be determined based on the quality of positioning information currently needed (e.g., positioning quality information provided on the interface requesting the position data).

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A data processing apparatus comprising:
one or more integrated circuit (IC) devices including a location processor configured to acquire and track measurements of location for a mobile wireless communication device; and
a host processor programmed with a host software manager configured to obtain various positioning input signals from different device positioning technologies and assemble a selected set of the various positioning input signals into a unified format;
wherein the data processing apparatus includes a hybrid fusion engine configured to receive data from the host software manager in the unified format and calculate a position of the mobile wireless communication device using the received data in accordance with input type information for the received data;
wherein the host software manager is further configured to manage a location database for wireless positioning and map aiding information used with the position calculation;
wherein the location database comprises a virtual database distributed between a first database local to the mobile wireless communication device and one or more second databases accessible over a network, wherein the host software manager maintains data relevant to the calculated position in the first database; and
wherein the host software manager controls selection and indexing of map data based on global coordinates from a satellite navigation receiver, including caching map data in the first database.

2. The data processing apparatus of claim 1, comprising the different device positioning technologies, which comprise:
   a satellite navigation receiver;
   a first range wireless transceiver;
   a second range wireless transceiver; and
   one or more sensors.

3. The data processing apparatus of claim 2, wherein the one or more sensors comprise:
   a motion sensor;
   an environment sensor; and
   an optical sensor.

4. The data processing apparatus of claim 2, wherein the host processor is an application processor programmed to run the hybrid fusion engine.

5. The data processing apparatus of claim 2, comprising a measurement aggregator between the different device positioning technologies and the host software manager.

6. The data processing apparatus of claim 1, wherein the host software manager is further configured to trigger the different device positioning technologies based on location context information.

7. The data processing apparatus of claim 6, wherein the location context information comes from multi-context detection based on user activity, dynamics and environment, and the host software manager is configured to trigger the different device positioning technologies to reduce power consumption while meeting a desired quality of positioning.

8. A data processing apparatus comprising:
   one or more integrated circuit (IC) devices including a location processor configured to acquire and track measurements of location for a mobile wireless communication device; and
   a host processor programmed with a host software manager configured to obtain various positioning input signals from different device positioning technologies and assemble a selected set of the various positioning input signals into a unified format;
   wherein the data processing apparatus includes a hybrid fusion engine configured to receive data from the host software manager in the unified format and calculate a position of the mobile wireless communication device using the received data in accordance with input type information for the received data;
   wherein the host software manager is further configured to manage a location database for wireless positioning and map aiding information used with the position calculation; and
   wherein the host software manager comprises:
   a middleware interface configured to communicate with a selected host middleware;
   an assistance interface configured to trigger AGNSS (Assisted Global Navigation Satellite System), predicted ephemeris, sensors, and wireless assistance procedures;
   a data interface through which the location database is managed;
   a power management module configured to provide context aware device management; and
   core logic configured to operate the middleware interface, the assistance interface, the data interface, and the power management module.

9. The data processing apparatus of claim 8, wherein the location database comprises a virtual database distributed between a first database local to the mobile wireless communication device and one or more second databases accessible over a network, wherein the host software manager maintains data relevant to the calculated position in the first database.

10. The data processing apparatus of claim 9, wherein the host software manager controls selection and indexing of map data based on global coordinates from a satellite navigation receiver, including caching map data in the first database.

11. A method comprising:
   obtaining various positioning input signals from different device positioning technologies and an IC-based location processor configured to acquire and track measurements of location for a mobile wireless communication device;
   triggering the different device positioning technologies based on location context information;
   assembling a selected set of the various positioning input signals into a unified format;
   sending assembled data in the unified format to a fusion engine configured to calculate a position of the mobile wireless communication device using the assembled data in accordance with input type information for the assembled data;
   receiving calculated position information from the fusion engine; and
   outputting the calculated position information for use by the mobile wireless communication device;
   wherein the location context information comes from multi-context detection based on user activity, dynamics and environment, and the triggering comprises triggering the different device positioning technologies to reduce power consumption while meeting a desired quality of positioning.

12. The method of claim 11, wherein the obtaining comprises:
   receiving a position input signal from a satellite navigation receiver;
   receiving a position input signal from a first range wireless transceiver;
   receiving a position input signal from a second range wireless transceiver; and
   receiving a position input signal from one or more sensors, including a motion sensor.

13. The method of claim 11, comprising providing location measurement aiding feedback to the IC-based location processor based on the calculated position information.

14. The method of claim 11, comprising managing a location database for wireless positioning and map aiding information used with the position calculation.

15. The method claim 14, wherein the location database comprises a virtual database distributed between a first database local to the mobile wireless communication device and one or more second databases accessible over a network, the method comprising maintaining data relevant to the calculated position in the first database.

16. The method of claim 15, comprising caching map data in the first database based on global coordinates from a satellite navigation receiver of the mobile wireless communication device.

17. The method of claim 11, wherein the triggering comprises sending wakeup and sleep signals to different ones of the different device positioning technologies based on the location context information.

* * * * *